Aug. 21, 1923.
J. D. BITONDI
1,465,802
ROLLING SCREEN GUIDE
Filed Jan. 10, 1918
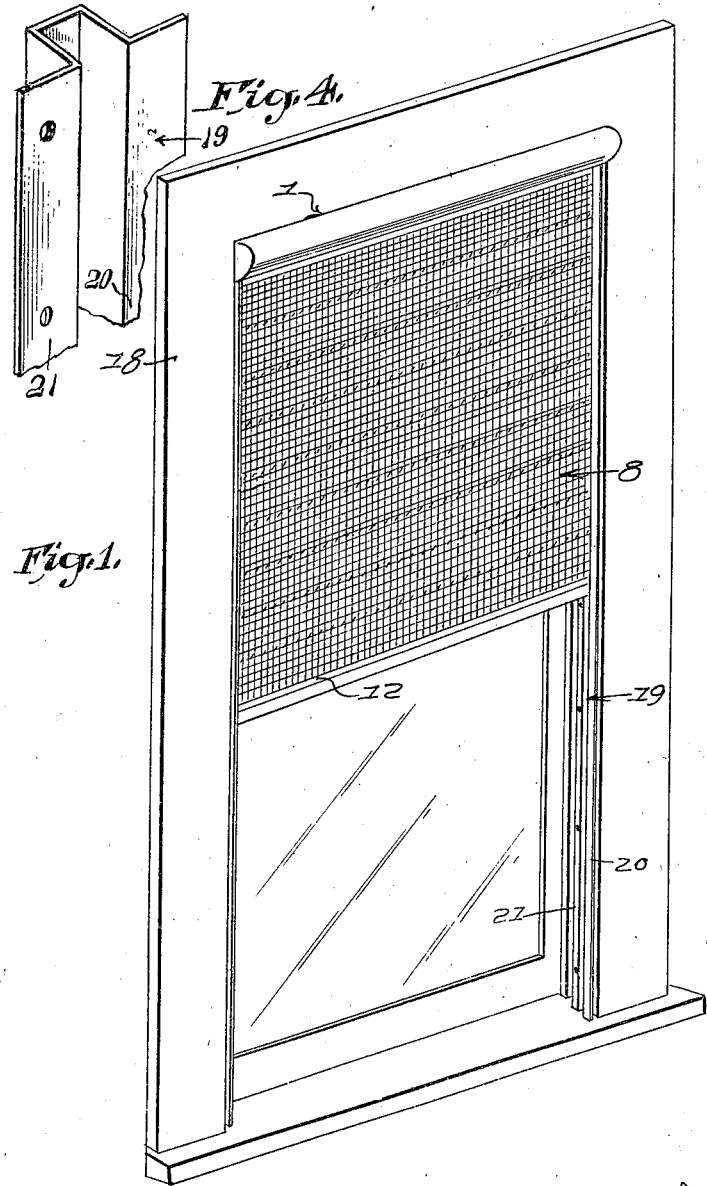
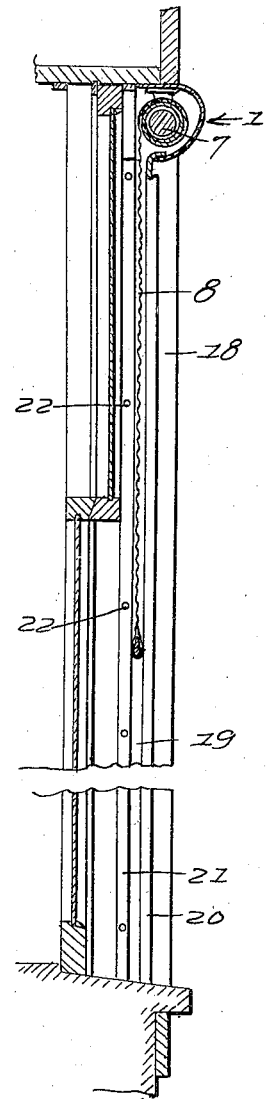
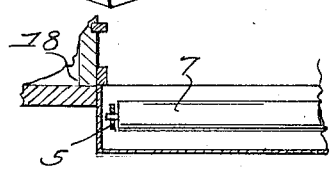
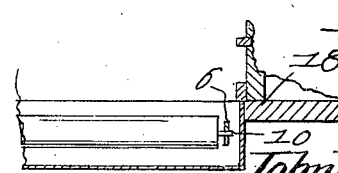
Inventor
John D. Bitondi,
By
E. Hume Talbert
Attorney Patented Aug. 21, 1923.

1,465,802

UNITED STATES PATENT OFFICE.

JOHN D. BITONDI, OF HARTFORD, CONNECTICUT.

ROLLING-SCREEN GUIDE.

Application filed January 10, 1918. Serial No. 211,217.

*To all whom it may concern:*

Be it known that I, JOHN D. BITONDI, a subject of the King of Italy, residing at Hartford, in the county of Hartford and State of Connecticut, have invented new and useful Improvements in Rolling-Screen Guides, of which the following is a specification.

The object of the invention is to provide a simple device of the character mentioned having an attaching flange for securement to the bead of a window frame and an additional flange acting as a reinforcement to prevent distortion of the free edge of the guide.

With this object in view the invention consists in a construction and combination of parts of which a preferred embodiment is shown in the accompanying drawings, wherein:—

Figure 1 is a perspective view of a window frame on which the invention is applied.

Figure 2 is a longitudinal sectional view of the structure of Figure 1.

Figure 3 is a transverse horizontal sectional view through one end of the housing.

Figure 4 is a detail perspective view showing a portion of the guide constituting the invention.

The invention is designed particularly for use in connection with rolling screens and similar devices and is illustrated in connection with a screen provided with a housing 8 in which is mounted the usual screen actuated roller 7 carried in brackets 5, the screen 8 being secured to the roller 7 for reeling on and off the latter and being equipped with a stretcher bar 12 at the lower end to maintain the free end of the screen in spanning relation with the window frame 18.

As the screen is unreeled from the roller, its side edges traverse the channels of the U-shaped guides 19 which are provided with the lateral longitudinal flanges 20 and 21 of which the latter is provided with holes for the reception of fastening devices such as screws 22 so that the guide may be secured to the outer bead of the window frame as clearly shown in Figure 2 of the drawings, the longitudinally extending lateral flange 20 serving as a reinforcement for the free edge of the adjacent portion of the guide to prevent distortion of the latter.

The flanges 20 and 21 extend in opposite directions from the free edges of the U-shaped element or channel member of the guide and are disposed in a common plane at substantially right angles to the legs of the U-shaped or channel member with which they connect.

The invention having been described what is claimed as new and useful is:

A guide for a rolling screen consisting of a U-shaped member for extension throughout the full length of a window frame and outwardly extending flanges integrally connected with the respective legs of said U-shaped member at the outer edge thereof, each flange disposed in a single plane at substantially right angles to the respective leg and extending the full length of said member, one of said flanges being provided with spaced holes through which screws may be passed to attach the guide to the outside bead of the window frame and the other flange acting as a reinforcement to prevent distortion of the free edge of the guide.

In testimony whereof I affix my signature.

JOHN D. BITONDI.